July 1, 1969   P. JEAN-FRANCOIS BONNAMY   3,452,953
BASE LEG CONNECTOR
Filed Sept. 22, 1967
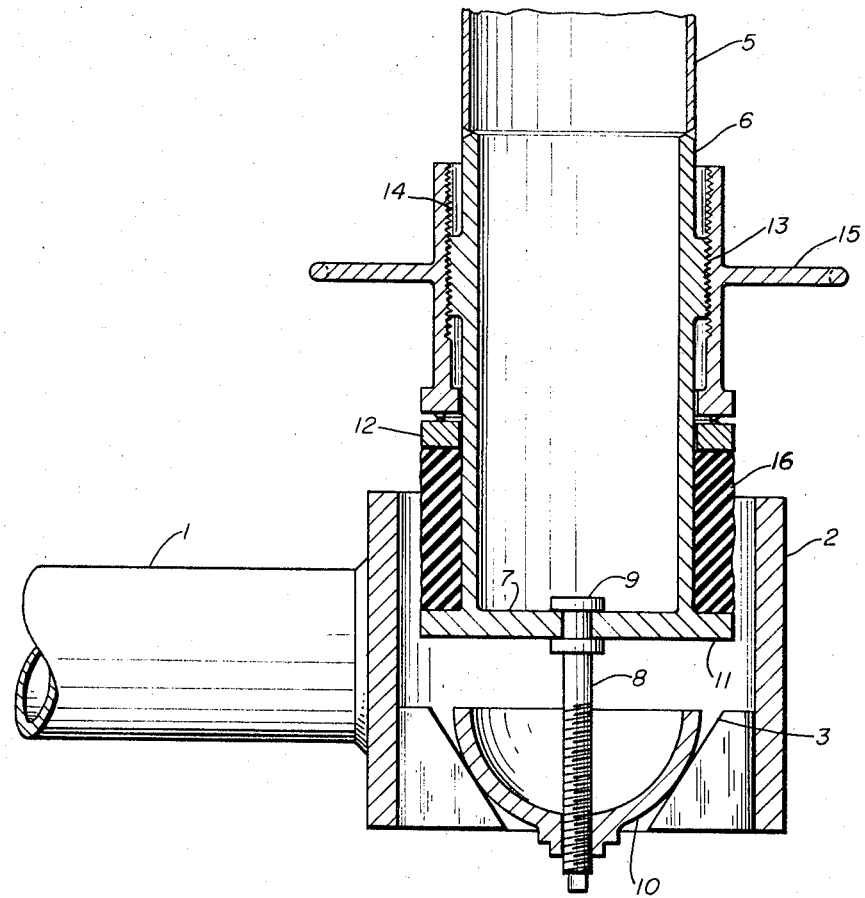
INVENTOR.
PHILIPPE JEAN-FRANÇOIS BONNAMY
BY
ATTORNEY United States Patent Office 3,452,953
Patented July 1, 1969

3,452,953
BASE LEG CONNECTOR
Philippe Jean-Francois Bonnamy, Tulsa, Okla., assignor to Combustion Engineering, Inc., New York, N.Y., a corporation of Delaware
Filed Sept. 22, 1967, Ser. No. 669,892
Int. Cl. F16b 7/00
U.S. Cl. 248—188                              2 Claims

ABSTRACT OF THE DISCLOSURE

The leg of a structure is adapted to fit a socket on a support for the structure. A vertical adjustment is provided for the leg in the socket and a deformable packing on the leg is squeezed out to make a stable link with the socket wall.

BACKGROUND OF THE INVENTION

Field of the invention

The present invention relates to connections between two structural members.

Description of the prior art

Subsea drilling and well completion is a developing art. Processing oil well production has largely been limited to surface equipment.

Plans are now laid to place initial processing equipment near subsea wellheads. This equipment demands a level base for anchoring in place.

Basic support structure available at subsea wellheads must hold the base which is in turn a mount for the production equipment. The connection between these two structures must be initially adjustable to level the base and then readily completed as a semi-permanent installation. The present invention is presumably a pioneer in solving this problem within the hostile environment of the sea.

SUMMARY OF THE INVENTION

A principal object of the invention is to provide spatial adjustment between a leg for a base structure and support structure for the base.

Another object is to manually connect the base structure and support structure in a semi-permanent union without the use of tools.

The invention contemplates provision of a female socket member as a part of a support structure for a base. The bottom of the socket has a conical surface upon which is received a hemispherical member threaded to the lower end of a leg of a base structure. A deformable member is mounted on the side of the leg and means provided to expand the deformable member laterally until it is engaged as a positive link between the internal walls of the socket and the external walls of the leg.

The invention contemplates the hemispherical member adjusted through the threaded connection. Subsequently, a ram structure threaded to the leg is carried against the deformable member to squeeze it into becoming the desired link.

Other objects, advantages and features of this invention will become apparent to one skilled in the art upon consideration of the written specification, appended claims, and attached drawing.

BRIEF DESCRIPTION OF THE DRAWING

A sectioned elevation of male-female connection in which the invention is embodied.

DESCRIPTION OF THE PREFERRED EMBODIMENT

The drawing discloses only that portion of a support structure which mounts a socket. Structural member 1 mounts a cylindrical socket member 2, the socket having a cone surface 3 near the bottom of the socket.

Surface 3 is disclosed as the surface of a conical frustum. This surface 3 flares outwardly in an upward direction to function as a landing surface for the lower end of a leg.

SUPPORT STRUCTURE

Member 1 is the sole evidence of the support structure. This structure could be a concrete pad positioned on the sea floor. More commonly, it is a spider framework connected to a conductor, or connector, pipe protruding from the sea floor as evidence of a completed oil well.

Separation, and other processing, equipment is mounted at the wellhead to receive oil well production. The spider framework is the beginning of adequate structural support for such wellhead equipment. A level base of proper horizontal dimensions is fixed to this spider framework as a semi-permanent mounting. This base is provided with legs with which the base surface is levelled and connected to the sockets of the spider framework. The present invention is in the structure of a base leg and framework socket.

ELEVATION ADJUSTMENT

Base leg 5 is disclosed in the form of a simple cylinder to which a barrel member 6 is attached as a downward extension.

Barrel 6 is preferably welded to the end of leg 5 and provided with a closure section 7. A central bore is formed in this end closure 7 and a threaded stem 8 mounted to rotate freely in the bore. A spindle-shaped formation 9 is carried in the bore, on the end of the threaded stem 8.

Hemispherical member 10 is threaded on stem 8 and the hemispherical surface of 10 is intended to land on conical surface 3 and centralize within the bore of socket 2. Leg 5, barrel 6 and stem 8 then have a latitude in horizontal adjustment with the surface of 10 rocking on surface 3.

A wrench can then be applied to turn stem 8 to obtain the desired vertical adjustment for leveling the horizontal surface of the base attached to the leg. Of course, a protective cover can be mounted over the wrench head on the lower end of stem 8.

LINKING

After the desired elevation is obtained, the semi-permanent link between leg and socket is completed. Basically, deformable packing 16 is squeezed radially outward until the internal sides of socket 2 are positively engaged with the packing.

Packing 16 can be made of various materials and in various shapes. A concept of the invention is simply that this material is deformable to function as a link. The deformation is performed by bringing flange 11 and bearing structure 12 toward each other with packing material 16 between them.

Flange 11 can be simply formed on the lower end of barrel 6. Packing 16 is mounted above flange 11 and about barrel 6. Bearing 12 is a ring about barrel 6 which is forced down against packing 16.

To apply the necessary downward force on bearing ring 12, a cylinder 13 is connected to the outside of barrel 6 through threads 14. A handwheel 15 is disclosed for cylinder 13 and it is through this simple provision that cylinder 13 is moved down, squeezing packing 16 until it deforms into engagement with the socket wall.

The invention definitely contemplates that the ram disclosed with cylinder 13, threads 14 and handwheel 15 can be given the form of a piston operated by pressure fluid to move down upon packing 16. It it well within the concept of the invention to supply fluid power from a remote source to deform packing 16 into a link and lock the structure to barrel 6.

Also it is to be recognized that this packing material can absorb much vibration which would otherwise be transmitted to the base leg 5 from the support framework of structure 1. Not only can a material selected for this service provide the positive link desired, but the material can also act as vibration insulation.

CONCLUSION

There are many small provisions desirable to supplement the invention. A lock may be provided to fix the position of cylinder 13 along the barrel 6 after it is in position. Anti-friction bearing surfaces can be provided between ring 12 and cylinder 13 to make it easy to manually turn the cylinder with handwheel 15.

The basic function of the structure should now be evident. Spatial adjustment is first obtained by rotation of screw 8. Semi-permanent linkage is then obtained by rotation of handwheel 15. The desired connection is then completed.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

The invention having been described, what is claimed is:

1. A connection between a support framework and a base platform, including,
   a socket mounted on a support framework and providing a landing surface in the shape of a conical frustum,
   a leg mounted on a base platform and oriented to extend down into the socket,
   a hemispherical landing member mounted to be vertically adjustable on the end of the leg extended down into the socket and adapted to engage and land upon the surface provided within the socket,
   and deformable structure mounted on the leg which can be deformed into engagement with the internal socket sides to complete a positive link between the leg and socket after the landing member of the leg has been adjusted to a desired position on the leg.

2. The connection of claim 1 wherein,
   the deformable structure is a packing material surrounding the lower end of the leg and arranged opposite the internal sides of the socket,
   and a cylindrical sleeve is linked to the leg with threads, the sleeve turning through the threads to travel down the leg and squeeze the packing outward into engagement with the socket sides.

References Cited

UNITED STATES PATENTS

| | | | |
|---|---|---|---|
| 156,927 | 11/1874 | Jewell | 248—188.4 |
| 2,244,089 | 6/1941 | Swartz | 248—188 |
| 2,456,480 | 12/1948 | Austin | 287—85 |
| 2,542,967 | 2/1951 | Waechter | 248—188.5 |
| 2,904,379 | 9/1959 | Nelson | 248—188 |
| 3,027,680 | 4/1962 | Gallagher | 248—188.4 |
| 3,131,898 | 5/1964 | Ewing | 248—188 |
| 3,335,987 | 8/1967 | Woolslayer | 248—188.4 |

FRANCIS K. ZUGEL, *Primary Examiner.*

U.S. Cl. X.R.

248—188.4; 287—85